| United States Patent [19] | [11] 4,024,228 |
|---|---|
| Dell'Amico et al. | [45] May 17, 1977 |

[54] PROCESS FOR THE PREPARATION OF ANHYDROUS GOLD TRICHLORIDE

[75] Inventors: Daniela Belli Dell'Amico, Carrara; Fausto Calderazzo, Ghezzano, both of Italy

[73] Assignee: Snam Progetti S.p.A., Milan, Italy

[22] Filed: Mar. 4, 1974

[21] Appl. No.: 447,644

[52] U.S. Cl. .............................. 423/491; 423/481; 423/539

[51] Int. Cl.² ...................... C01G 7/00; C01B 7/08; C01B 17/48

[58] Field of Search .............. 423/38, 39, 491, 539, 423/481

[56] References Cited

OTHER PUBLICATIONS

J. W. Mellor's "A Comprehensive Treatise on Inorganic and Theoretical Chemistry", vol. 3, p. 590, Longmans, Green & Co., New York, N.Y.

*Primary Examiner*—Edward Stern
*Attorney, Agent, or Firm*—Ralph M. Watson

[57] ABSTRACT

Anhydrous gold trichloride is prepared by stirring a suspension of finely divided tetrachloro-auric acid, having the thionyl chloride at a temperature in the range from 20° to 65° C in the absence of light, whereby said tetrachloro-auric acid and thionyl chloride react to form the desired end product.

2 Claims, No Drawings

PROCESS FOR THE PREPARATION OF ANHYDROUS GOLD TRICHLORIDE

The present invention relates to a process for the preparation of anhydrous gold trichloride starting from hydrated tetrachloro-auric acid. The preparation of gold trichloride is known and occurs under very drastic reaction conditions.

In fact one method consists in treating the metal element with chlorine at temperatures ranging from 220° to 250° C: the temperature being chosen so as to arrive at a proper compromise between the wish to obtain reasonable reaction rates and the need of avoiding the thermal decomposition of gold monochloride.

Other methods consist in treating metallic gold with $SO_2Cl_2$ at 160° C, or with ICL.

Furthermore, it is known that gold trichloride may be prepared by treating tetrachloro-auric acid with chlorine at 200° C, but the obtained product is impure because of the incomplete conversion of the starting product. It has now been found, which is the subject of the present invention, that it is possible to obtain, at quantitative yields and in a simple and economical way, anhydrous gold trichloride by treating tetrachloro-auric acid with thyonil chloride, the reaction occuring at room temperature or at a temperature always lower than 65° C.

The reaction is very simple since the starting product is the commercially available tetrachloro-auric acid, to which the formula $H Au Cl_4 \cdot 3H_2O$ is attributed.

Formally the reaction may be schematized as follows:

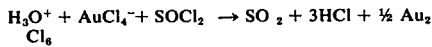

In spite of the operating conditions, no appreciable reduction to gold monochloride is noted: the reaction is practically complete towards the formation of trichloride, which is also free from $SO_2$ and $SOCl_2$ traces. The gold salt, prepared as aforesaid, may be employed as a catalyst in the carboxylation of glycols according to the Italian Patent Application No. 24468 A/71 of May 13, 1971, now Italian Pat. No. 926,748, which corresponds to U.S. application Ser. No. 513,324, filed Oct. 9, 1974 as a continuation of Ser. No. 252,886, filed May 12, 1972, or may be used as starting material in the preparation of gold-chlorocarbonyl derivatives and phosgene as described in a copending application, now Italian patent No. 978,791, both owned by the assignee of this application. The invention will be more thoroughly understood from an examination of examining the following illustrative example.

EXAMPLE

As a starting material use was made of the commercially available tetrachloro-auric acid (C. Erba, Milano; H. Drijfhout, Amsterdam).

5.0 g (12.70 mmoles) of finely subdivided tetrachloro-auric acid was suspended in 125 ml of thyonil chloride and stirred at room temperature over 5 hours after having been sheltered from the light. The gas development started about 20 minutes after the reagent mixing and stopped after 4 hours. At the end the solvent volume was reduced to 40 ml under a reduced pressure, then heptane was added. A red, crystalline, chloride was filtered and dried under vacuum: 3.2 g of salt were obtained at a 83.1% yield.

The reaction was also performed at a higher temperature (~65° C): we noted higher rates and also good results, both with respect to the yield and to the product purity.

Gold trichloride was slightly soluble in $SOCl_2$, the solubility being lightly lower than 1% (weight/volume).

The analysis gave the following results:

Found: Au, 65.21; Cl, 34.30; Calculated Au, 64.94; Cl, 35.06.

The infrared examination did not produce good spectra, since the gold salt seems to react with potassium bromide of the collecting disks. However the obtained spectra were sufficient to assure the complete absence of bands attributable to $SO_2$ or $SOCl_2$.

The fact that the product was of gold trichloride was confirmed by reacting it with acetonitrile and pyridine, which gave rise to complexes well known from the scientific papers:

a. the reaction with acetonitrile was carried out by adding solid $Au_2Cl_6$ into $CH_3CN$ cooled at about −80° C: then the temperature was slowly increased.

After a partial evaporation of the solvent, $AuCl_3$ ($CH_3CN$) was recovered by filtering at −70° C (yield equal to 50%);

b. the adduct with pyridine was prepared by employing the stoichiometric amount of the ligand in $CH_2Cl_2$ as solvent.

The ligand was added to a suspension of gold trichloride previously cooled at −80° C and the complex was isolated by a filtration performed at room temperature.

The analysis of the aforesaid complexes confirmed the formula $AuCl_3$ (L) wherein L was equal to $CH_3CN$ or $C_5H_5N$.

$AuCl_3(CH_3CN)$ Found: C, 7.17; H, 0.97; Au, 56.76; Cl, 30.81; N, 4.08; Calculated: C, 6.97; H, 0.88; Au, 57.19; Cl, 30.88; N, 4.07.

$AuCl_3(C_5H_5N)$ Found: C, 15.85; H, 1.48; Au, 49.80; Cl, 27.15; N, 3.95; Calculated: C. 15.70; H, 1.32; Au, 51.50; Cl, 27,81; N, 3.66.

What we claim is:

1. Process for the preparation of anhydrous gold trichloride consisting in reacting tetrachloro-auric acid with thionyl chloride by stirring a suspension in thionyl chloride of finely divided tetrachloro-auric acid having the formula $HAuCl_4 \cdot 3H_2O$ at a temperature in the range from 20° to 65° C, and then recovering said anhydrous gold trichloride from the reaction mixture.

2. Process for the preparation of anhydrous gold trichloride as claimed in claim 1, wherein the reaction is carried out in the absence of light.

* * * * *

UNITED STATES PATENT AND TRADEMARK OFFICE
CERTIFICATE OF CORRECTION

PATENT NO. : 4,024,228
DATED : May 17, 1977
INVENTOR(S) : Daniela Belli Dell'Amico, et al It is certified that error appears in the above-identified patent and that said Letters Patent are hereby corrected as shown below:

First page, line 3 of "Abstract" after "the" (first occurrence)

insert --formula $HAuCl_4 \cdot 3H_2O$, in--.

Column 1, line 51, After "of" delete "examining".

Column 2, line 47, After "Cl," correct "27,81" to read --27.81--

Signed and Sealed this

Twenty-second Day of November 1977

[SEAL]

Attest:

RUTH C. MASON
Attesting Officer

LUTRELLE F. PARKER
Acting Commissioner of Patents and Trademark.